US012800093B2

(12) United States Patent
Liu

(10) Patent No.: US 12,800,093 B2
(45) Date of Patent: Nov. 17, 2026

(54) ADSORPTION DEVICE FOR FIXED BRACKET

(71) Applicant: MAGIC CONTROL TECHNOLOGY CORPORATION, New Taipei City (TW)

(72) Inventor: Pei-Chung Liu, New Taipei City (TW)

(73) Assignee: MAGIC CONTROL TECHNOLOGY CORPORATION, New Taipei City (TW)

( * ) Notice: Subject to any disclaimer, the term of this patent is extended or adjusted under 35 U.S.C. 154(b) by 43 days.

(21) Appl. No.: 19/069,989

(22) Filed: Mar. 4, 2025

(65) Prior Publication Data

US 2026/0168614 A1 Jun. 18, 2026

(30) Foreign Application Priority Data

Dec. 12, 2024 (TW) ................................ 113148425

(51) Int. Cl.
*F16M 11/08* (2006.01)
*F16M 11/20* (2006.01)
*F16M 13/02* (2006.01)

(52) U.S. Cl.
CPC ...... *F16M 11/2007* (2013.01); *F16M 13/022* (2013.01); *F16M 2200/08* (2013.01)

(58) Field of Classification Search
None
See application file for complete search history.

(56) References Cited

U.S. PATENT DOCUMENTS 5,685,661 A * 11/1997 Marka ..................... F16F 15/06 403/120
6,193,197 B1 * 2/2001 Lian ........................ F16B 47/00 248/309.3
7,226,026 B2 * 6/2007 Lin ......................... F16B 47/00 248/205.8
7,469,868 B2 * 12/2008 Bury ....................... F16B 47/00 248/205.8
7,607,622 B2 * 10/2009 Carnevali ............... F16B 47/00 248/205.8

(Continued)

FOREIGN PATENT DOCUMENTS

CN 211371698 U 8/2020

OTHER PUBLICATIONS

Taiwanese Office Action (8 pages) issued Dec. 5, 2026, in Taiwanese patent application No. 113148425, with Search Report and English translation of Search Report.

*Primary Examiner* — Nkeisha Smith
(74) *Attorney, Agent, or Firm* — Nixon Peabody LLP

(57) ABSTRACT

An adsorption device for fixed bracket is provided with a shaft in the center of a suction cup seat. The shaft passes through an elastic element, a base, housing and a cam in order, and then a pin is set so that the pin contacts a cam curve of the cam, and the cam is fixed to a rotating nut. Wherein, when the rotating nut and the cam are rotated in the first direction, the cam drives the shaft through the pin to move in a direction away from the suction cup seat, thereby causing a vacuum adsorption effect between the suction cup body of the suction cup seat and an object. When the rotating nut and the cam are rotated in the opposite second direction, the cam drives the shaft through the pin to move closer to the suction cup seat, thereby releasing the vacuum adsorption effect.

13 Claims, 11 Drawing Sheets

(56) References Cited

U.S. PATENT DOCUMENTS

| | | | | |
|---|---|---|---|---|
| 7,635,111 | B2 * | 12/2009 | Hara | F16B 47/00 248/205.8 |
| 7,661,648 | B2 * | 2/2010 | Lin | F16B 47/00 248/205.5 |
| 7,850,133 | B2 * | 12/2010 | Carnevali | F16B 47/00 248/205.8 |
| 7,913,963 | B2 * | 3/2011 | Cheng | F16B 47/00 248/205.5 |
| 8,087,625 | B2 * | 1/2012 | Chang | F16M 11/10 248/205.8 |
| 8,091,843 | B2 * | 1/2012 | Tsai | F16M 11/2035 248/205.5 |
| 8,944,392 | B2 * | 2/2015 | Yang | F16M 11/14 248/205.5 |
| 9,732,785 | B2 * | 8/2017 | Kobayashi | F16B 47/00 |
| 10,946,810 | B2 * | 3/2021 | MacNeil | F16M 11/10 |
| 11,019,910 | B2 * | 6/2021 | Walton | F16M 11/105 |
| 11,079,064 | B1 * | 8/2021 | Cifers | A01K 97/00 |
| 11,686,431 | B1 * | 6/2023 | Lin | F16M 11/14 248/205.5 |
| 12,388,922 | B1 * | 8/2025 | Tian | H04M 1/04 |
| 2010/0044535 | A1 * | 2/2010 | Cheng | F16B 47/00 248/188.9 |
| 2010/0252700 | A1 * | 10/2010 | Wang | F16M 11/10 248/206.2 |
| 2011/0297716 | A1 * | 12/2011 | Mo | B60R 11/0241 224/559 |
| 2013/0134284 | A1 * | 5/2013 | Hu | F16M 11/041 248/206.2 |
| 2024/0067103 | A1 | 2/2024 | Iverson | |

* cited by examiner

ADSORPTION DEVICE FOR FIXED BRACKET

CROSS-REFERENCE TO RELATED APPLICATION

This application claims the priority of Taiwanese patent application No. 113148425, filed on Dec. 12, 2024, which is incorporated herewith by reference.

BACKGROUND OF THE INVENTION

1. Field of the Invention

The present invention relates generally to a vacuum adsorption device, and more particularly, to an adsorption device to be installed on a fixed bracket for fixing handheld electronic devices such as mobile phones and navigation devices.

2. The Prior Arts

There are many types of known fixed brackets for fixing handheld electronic devices such as mobile phones and navigation devices. A common structure that uses vacuum adsorption to fix the fixed bracket to a glass, or a smooth or textured flat hard surface, generally comprises a base and a suction cup body arranged below the base, wherein a central rod is arranged above the suction cup body, a lever is arranged on the side of the base, and a connecting rod is connected between the lever and the central rod; when the suction cup body contacts the smooth surface of an object and then is pressed down appropriately, the lever is pulled to move the center rod away from the suction cup body through the connecting rod, so that the center of the suction cup body is lifted upward, reducing the space between the suction cup body and the surface of the object. Thereby, a vacuum adsorption effect is generated to fix the fixed bracket to the surface of the object. When the user wants to remove the fixed bracket from the surface of the object, because the suction cup body is firmly attached to the surface of the object, the center rod cannot be moved toward the suction cup body by pulling the lever in the opposite direction. The protrusions arranged on the side of the suction cup body are pulled to create a gap at the edge of the suction cup body, allowing air to flow through the gap between the suction cup body and the surface of the object to release the vacuum adsorption effect.

The conventional adsorption device for fixed bracket has the lever disposed at an eccentric position (i.e., at the side) of the base. Therefore, it is easy to cause the base to become unbalanced and shake when the lever is moved to make the suction cup body to adsorb or release the adsorption of the object surface, thereby the suction cup body cannot be completely perpendicular to the surface of the object being sucked due to the shaking of the base, and the best suction effect cannot be achieved. In order to overcome this problem, the user must support and press the base with one hand and uses the other hand to operate the lever, causing inconvenience in use.

SUMMARY OF THE INVENTION

A primary objective of the present invention is to provide an adsorption device for an adsorption-type fixed bracket, which is not easy to shake when adsorbing and releasing the fixed bracket on the surface of an object, thereby more stable and easier to operate.

The adsorption device for the fixed bracket provided by the present invention comprises: a suction cup seat having a flexible suction cup body and a shaft formed at the center of the back side of the suction cup body; an elastic element disposed on the suction cup seat; and a base, having a raised portion formed at a central position, and a central hole formed at the raised portion; a housing, having an shaft hole formed at a central position, and two extension walls formed on the housing and symmetrically arranged with the shaft hole as the center; a cam, arranged on the housing and passed through by the shaft; a pin, arranged perpendicularly to the shaft and making the shaft contact the cam curve of the cam; and a screw cap, rotatably arranged on the housing and connected to the cam; wherein the two ends of the elastic element act on the suction cup seat and the base; wherein when the screw cap is rotated in a first direction to rotate the cam in the first direction, the cam drives the shaft through the pin to move away from the suction cup body, so that a vacuum adsorption effect is generated between the suction cup body and the object; and when the screw cap is rotated in a second direction opposite to the first direction to drive the cam to rotate in the second direction, the cam drives the shaft to move toward the direction close to the suction cup body through the pin, thereby releasing the vacuum adsorption effect between the suction cup body and the object. With such a structure, when the user operates the suction cup body to adsorb or release the adsorption of the object surface, the user rotates the suction cup body at the center of the suction cup seat, so the operation is more stable and does not shake, and the best adsorption effect can be obtained. In addition, the operation can be executed with one hand.

In a preferred embodiment of the present invention, a cylinder is concentrically formed in the screw cap, and a plurality of grooves is formed on an inner surface of the cylinder; the cam is cylindrical, a plurality of convex strips is formed on an outer surface of the cam, and the convex strips are slidably matched to the grooves so that the cam is connected to the screw cap.

A preferred embodiment of the present invention further includes: a cover plate fixedly disposed on the free ends of the extension walls of the housing. As such, the cam can be restricted to the range between the two extension walls of the housing.

Preferably, the free ends of the extension walls are respectively provided with a plurality of screw holes, and the cover plate is provided with a plurality of holes corresponding to the screw holes, and a plurality of screws is screwed into the cover plate by passing through the holes to fix the cover plate to the extension walls.

Preferably, the shaft has a non-circular radial cross section, and the shaft hole has a shape corresponding to the radial cross section of the shaft. As such, the suction cup seat can only be restricted to move in the axial direction and cannot rotate.

Preferably, a fixing portion made of material harder than that of the suction cup body is formed at the center of the suction cup seat, and the shaft is formed on the fixing portion. Accordingly, the shaft can be more firmly combined with the suction cup body.

In order to allow the adsorption device to be rotatably connected to the fixed bracket, the present invention further includes: a first pivot assembly, arranged on the cover plate and exposing the screw cap and used to connect with a second pivot assembly rotatably disposed on a bracket rod of the fixed bracket.

Preferably, the first pivot assembly has a base body, one end of the base body forms an ear, and the other end of the base body forms a screw, and the screw passes through a through hole of the cover plate to match a nut, so as to dispose the first pivoting assembly on the cover plate.

Preferably, the present invention forms a protruding platform at the other end of the base body, and the screw is formed on the protruding platform; and wherein the cover plate is formed with a recessed platform, the through hole is located at the bottom of the recessed platform, and the protruding platform matches with the recessed platform.

Preferably, the present invention forms wings on opposite sides of the base body, each wing is accommodated in the space between the sides of the two extension walls to prevent the first pivot assembly from rotating.

Preferably, a ring-shaped adhesive gel sheet is provided under the suction cup body, so that the suction cup body is adsorbed on a textured flat surface of an object and increases the fit between the suction cup body and the surface of the object.

In a preferred embodiment of the present invention, the adhesive gel sheet is PU glue.

In a preferred embodiment of the present invention, a flange protruding outward is formed on the circumferential outer edge of the suction cup body to facilitate a quick release of the vacuum adsorption of the suction cup body on the surface of the object.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The technical solutions of the present invention will be described clearly and completely below in conjunction with the specific embodiments and the accompanying drawings. It should be noted that when an element is referred to as being "mounted or fixed to" another element, it means that the element can be directly on the other element or an intervening element may also be present. When an element is referred to as being "connected" to another element, it means that the element can be directly connected to the other element or intervening elements may also be present. In the illustrated embodiment, the directions indicated up, down, left, right, front and back, etc. are relative, and are used to explain that the structures and movements of the various components in this case are relative. These representations are appropriate when the components are in the positions shown in the figures. However, if the description of the positions of elements changes, it is believed that these representations will change accordingly.

Unless otherwise defined, all technical and scientific terms used herein have the same meaning as commonly understood by one of ordinary skill in the art of the present invention. The terminology used herein is for the purpose of describing particular embodiments only and is not intended to limit the present invention. As used herein, the term "and/or" includes any and all combinations of one or more of the associated listed items.

Figure 1:
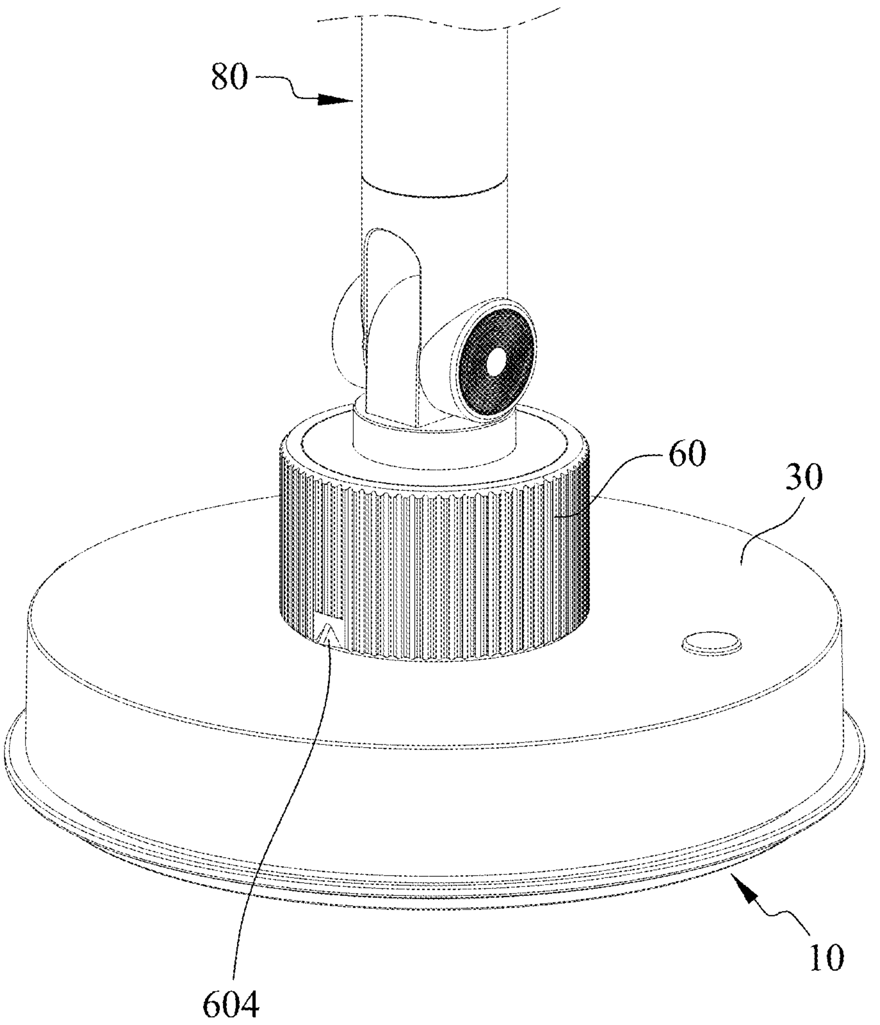
FIG. 1 is a perspective view showing the appearance of a fixed bracket of the present invention.
Figure 2:
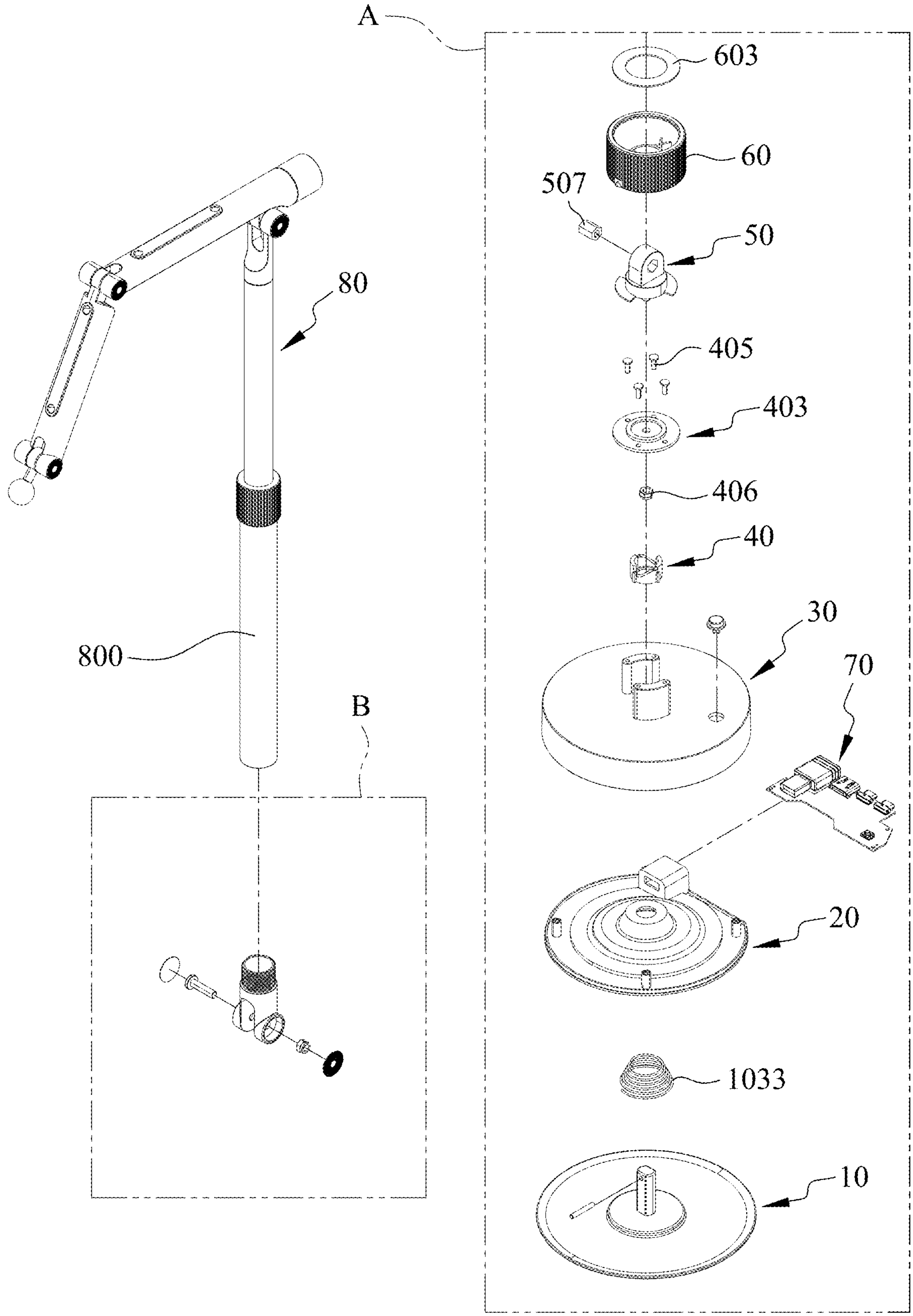
FIG. 2 is a perspective exploded view showing the assembly relationship of the main components of the fixed bracket of the present invention.
Figure 3:
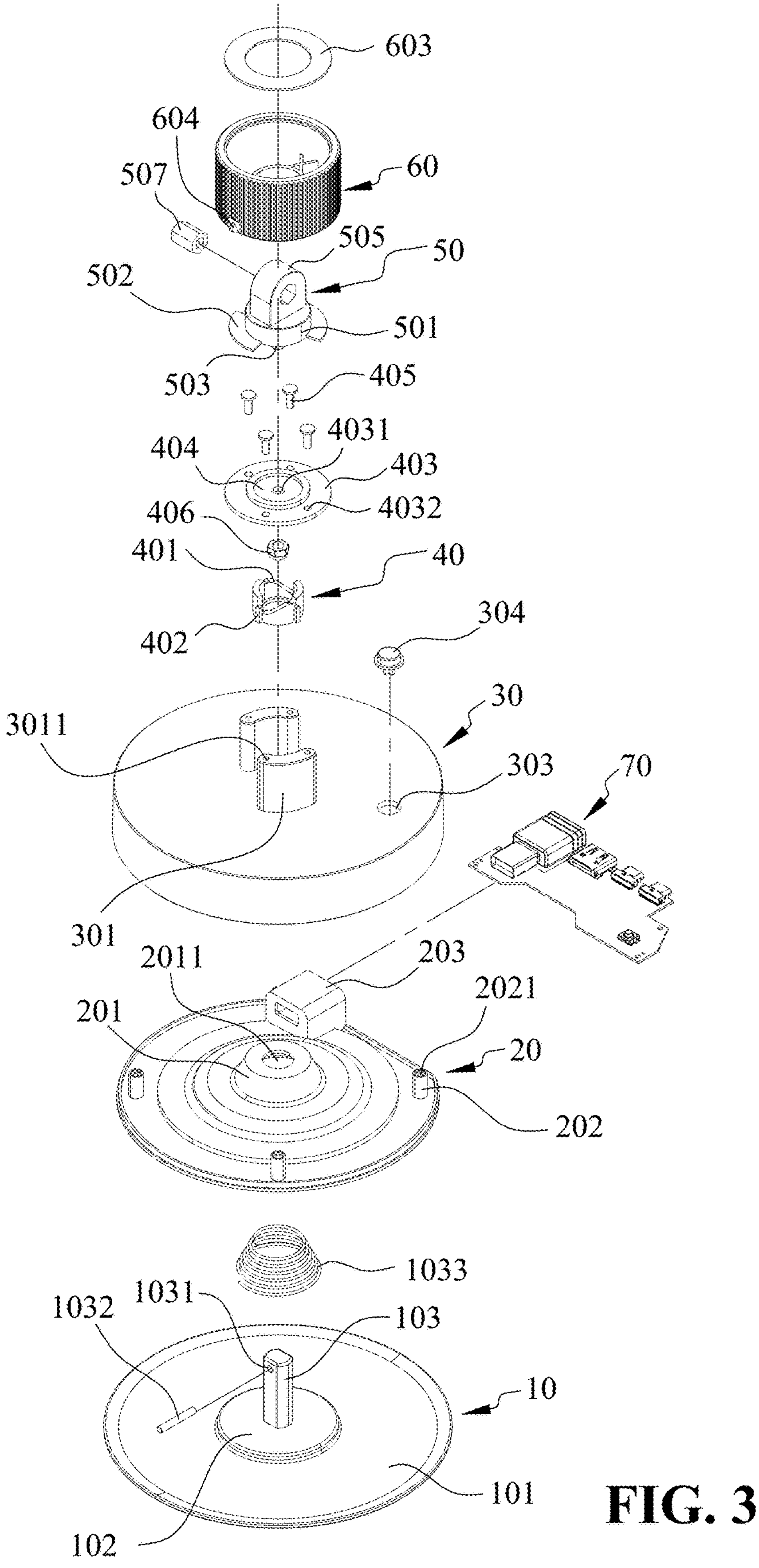
FIG. 3 is an enlarged view of part A of FIG. 2.
Figure 4:
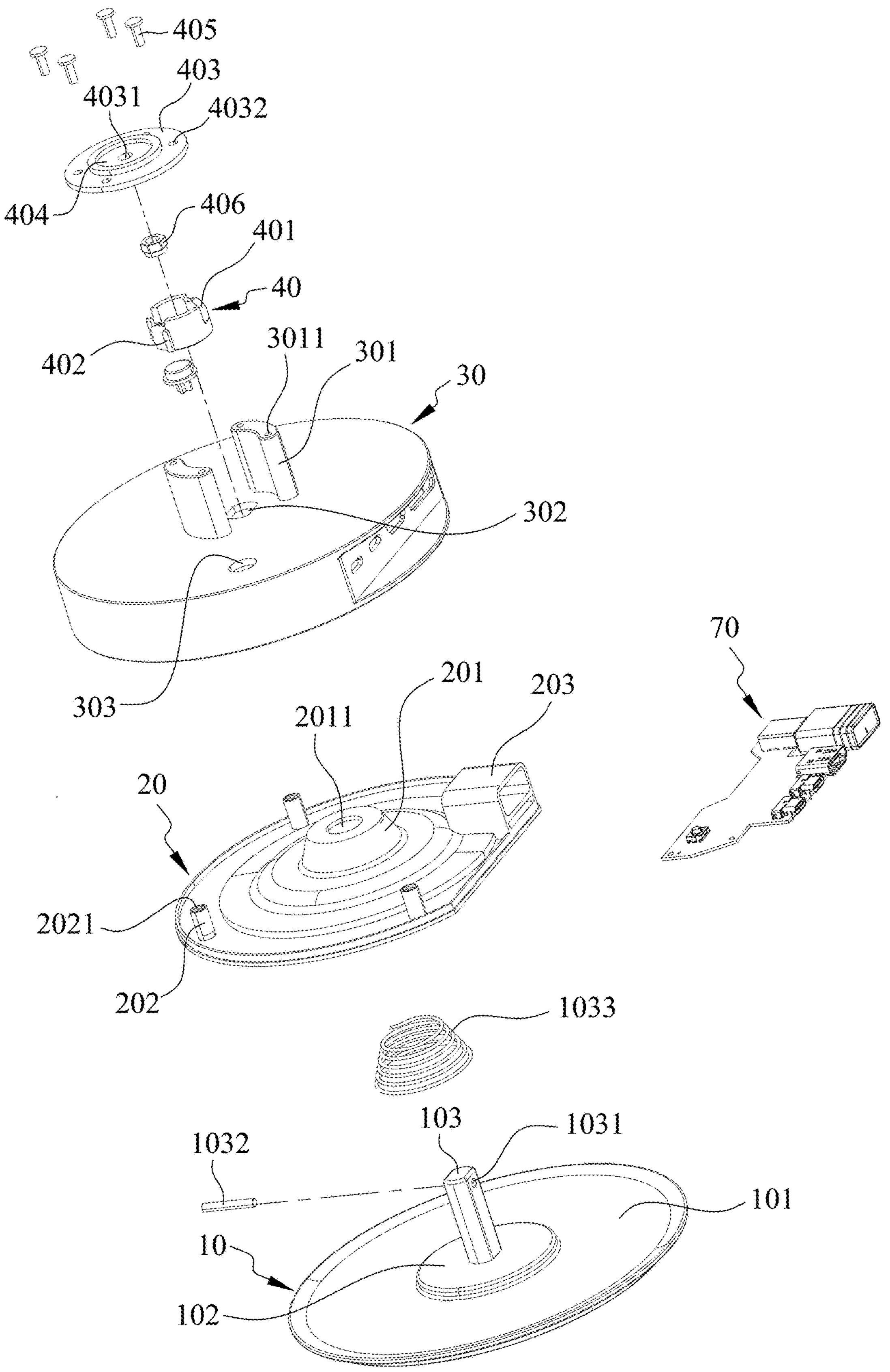
FIG. 4 is a partial enlarged view showing portion A of FIG. 2 from another angle.
Figure 11:
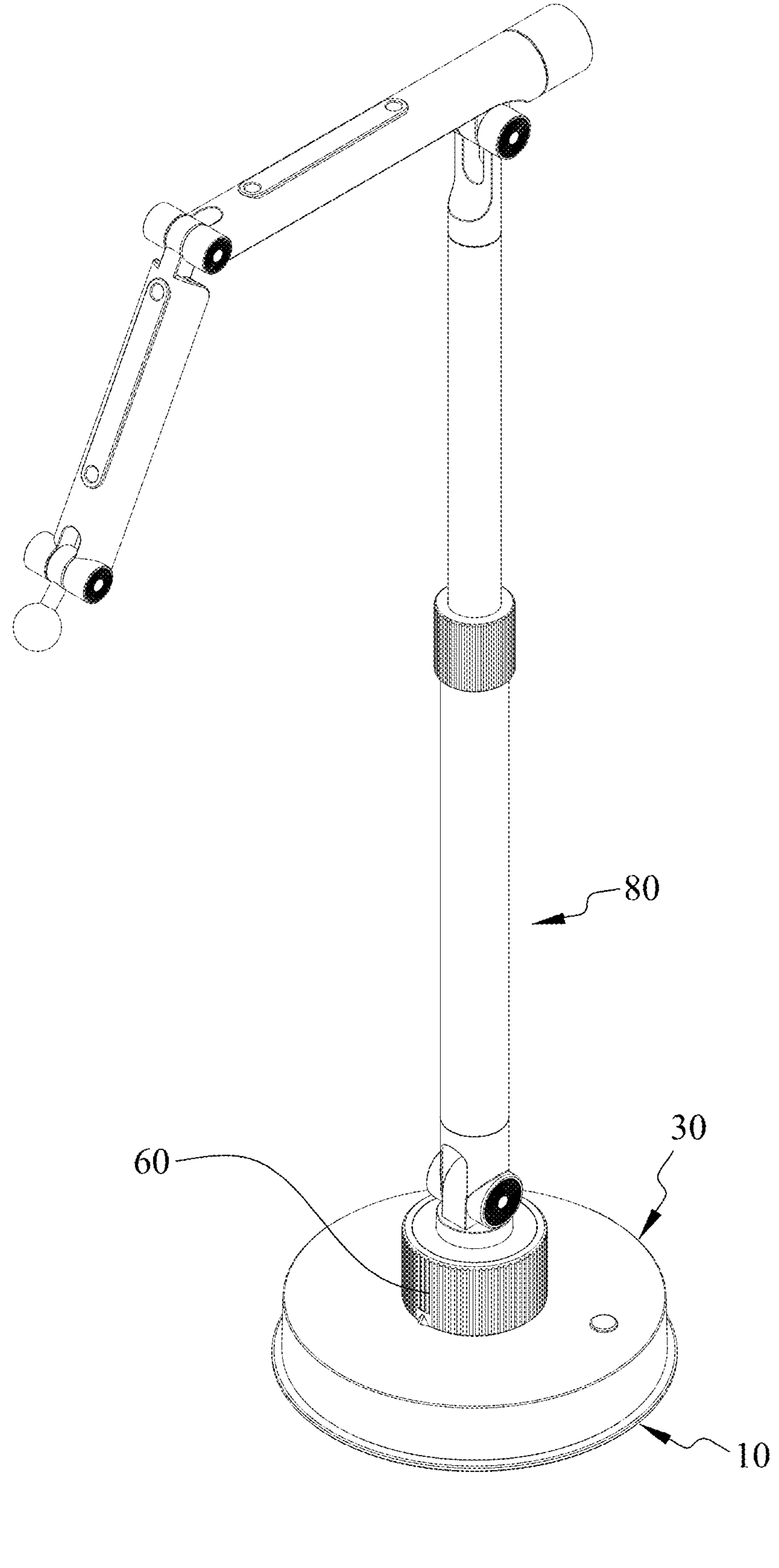
FIG. 11 is a perspective view showing the use of the present invention in the fixed bracket for an electronic product.

As shown in FIG. 1 and FIG. 11, the adsorption device for fixed bracket provided by the present invention is a suction cup type fixed device for connecting a bracket rod 800 of the fixed bracket 80, so that the fixed bracket 80 can be fixed by the adsorption device on a smooth surface such as glass. The fixed bracket 80 is used to hold a handheld electronic device, such as, a mobile phone, a navigation device, etc. The adsorption device includes a suction cup seat 10, a base 20, a housing 30, a cam 40, and a screw cap 60. As shown in FIGS. 2 to 4, the suction cup seat 10 comprises a flexible suction cup body 101 and a shaft 103 formed in the center of the suction cup body 101. In a preferred embodiment of the present invention, the shaft 103 is formed with a non-circular radial cross section. For example, the shaft 103 originally having a circular cross section can be further formed into having two planes on opposite sides, and a pin hole 1031 passing through the two planes is provided at a position close to the free end of the shaft. Preferably, the center of the suction cup seat 10 is formed with a fixing portion 102 made of a material harder than the suction cup body 101, and the shaft 103 is integrally formed on the fixing portion 102, thereby making the shaft 103 having a relatively stronger strength. Preferably, an adhesive gel sheet 104 is disposed below the suction cup body 101. Preferably, the adhesive gel sheet 104 is formed into a circular ring shape, and the outer diameter of the adhesive gel sheet 104 is slightly smaller than the outer diameter of the suction cup body 101. The embodiment of the present invention can use PU glue to form the adhesive gel sheet 104, and the adhesive gel sheet 104 has the adhesion capability, so that the suction cup body 101 can also be adsorbed on the a hard flat textured surface of an object.

The elastic element 1033 is preferably a compression spring, the maximum outer diameter of which is smaller than the outer diameter of the fixing portion 102 of the suction cup seat 10, so that the elastic element 1033 can be placed on the fixing portion 102 and the shaft 103 can pass through.

As shown in FIGS. 2 to 4, the base 20 is made of a harder material than the suction cup body 101 and is integrally formed to provide a mounting for a circuit board 70 and related electronic components. A raised portion 201 is formed at the center of the base 20, and a center hole 2011 is formed in the center of the raised portion 201. A connection port seat 203 for installing a connection port (such as a USB connection port) may also be provided on the side of the base 20. A plurality of positioning posts 202 may be provided on the surface of the base 20, with a screw hole 2021 formed at the end of each positioning post 202. The base 20 is used to mount the circuit board 70 and the USB connector electrically connected to the circuit board 70 is mounted in the connection port seat 203. After the shaft 103 of the suction cup seat 10 passes through the elastic element 1033 and the center hole 2011 of the base 20, the two ends of the elastic element 1033 are respectively in contact with the upper surface of the fixing portion 102 and the lower surface of the base 20. In other words, the suction cup seat 10 and the base 20 have a tendency to separate from each other due to the elasticity of the elastic element 1033.

As shown in FIGS. 2 to 4, the housing 30 is a hollow shell in the shape of a disk, and a shaft hole 302 is formed at the center of the outer surface thereof. The two extension walls 301 are preferably formed as partial arc segments forming a virtual circle, and at least one screw hole 3011 is formed at the end of each extension wall 301. A button hole 303 may be provided on the side of the housing 30, and a button 304 for controlling the power supply provided on the circuit board 70 may be exposed from the button hole 303 from bottom. In addition, as shown in FIG. 4, one side of the housing 30 may form a plane, and a plurality of connection port holes are provided on the plane for configuring the connection ports provided on the circuit board 70. More specifically, the upper surface of the housing 30 may be provided with a plurality of connection port holes. The upper and lower surfaces can both be formed in a round shape, and the plane is formed between the upper and lower surfaces of the round circles, so as to take into account both the aesthetic appearance and the practicality of connecting other electronic devices. The housing 30 and the base 20 are fixed to each other by screws (not shown) that are locked into the screw holes 2021 of the positioning posts 202.

As shown in FIGS. 2 to 4, the cam 40 may be a cylindrical cam, that is, a cam curve 401 is formed at the end edge of the cylinder, and a plurality of convex strips 402 are formed on the outer surface of the circumference of the cam 40. The length of the convex strip 402 extends parallel to the central axis of the cylinder. The cam 40 is disposed between the two extension walls 301 on the housing 30 and is passed through by the shaft 103 via the shaft hole 302 of the housing 30, and then the pin 1032 passes through the pin hole 1031 of the shaft 103, so that the pin 1032 and the shaft 103 are in an orthogonal state, and the pin 1032 contacts the cam curve 401 of the cam 40.

Figure 7:
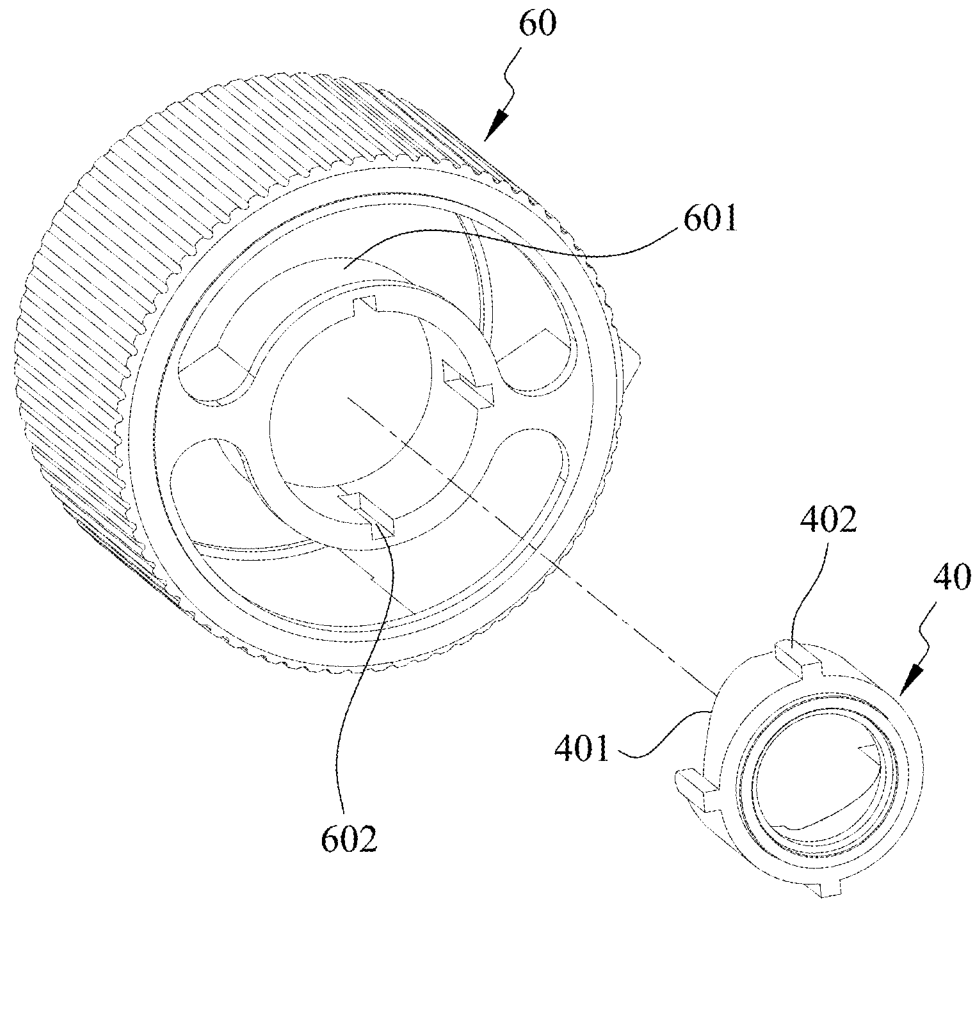
FIG. 7 is a perspective schematic view showing the screw cap structure shown in FIG. 2 from another angle.

As shown in FIG. 3 and FIG. 7, a cylinder 601 is concentrically formed inside the screw cap 60. The inner surface of the cylinder 601 is formed with a plurality of grooves 602. The lengths of the grooves 602 are parallel to the central axis of the cylinder 601 and extends to a suitable length for the convex strip 402 disposed on the periphery of the cam 40 to slide into and fit with, so that the screw cap 60 and the cam 40 are connected together.

Figure 8:
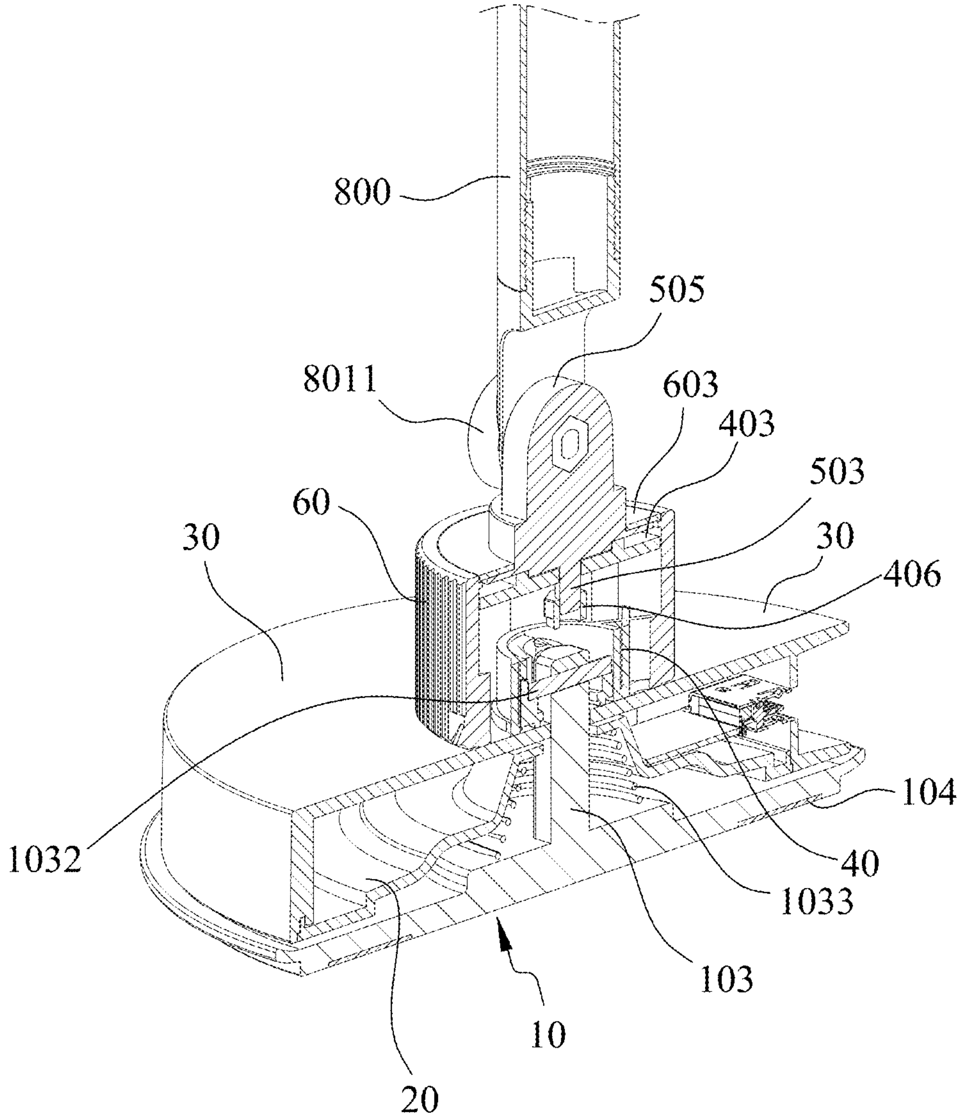
FIG. 8 is a perspective cross-sectional view showing the fixed bracket structure of the present invention.
Figure 9:
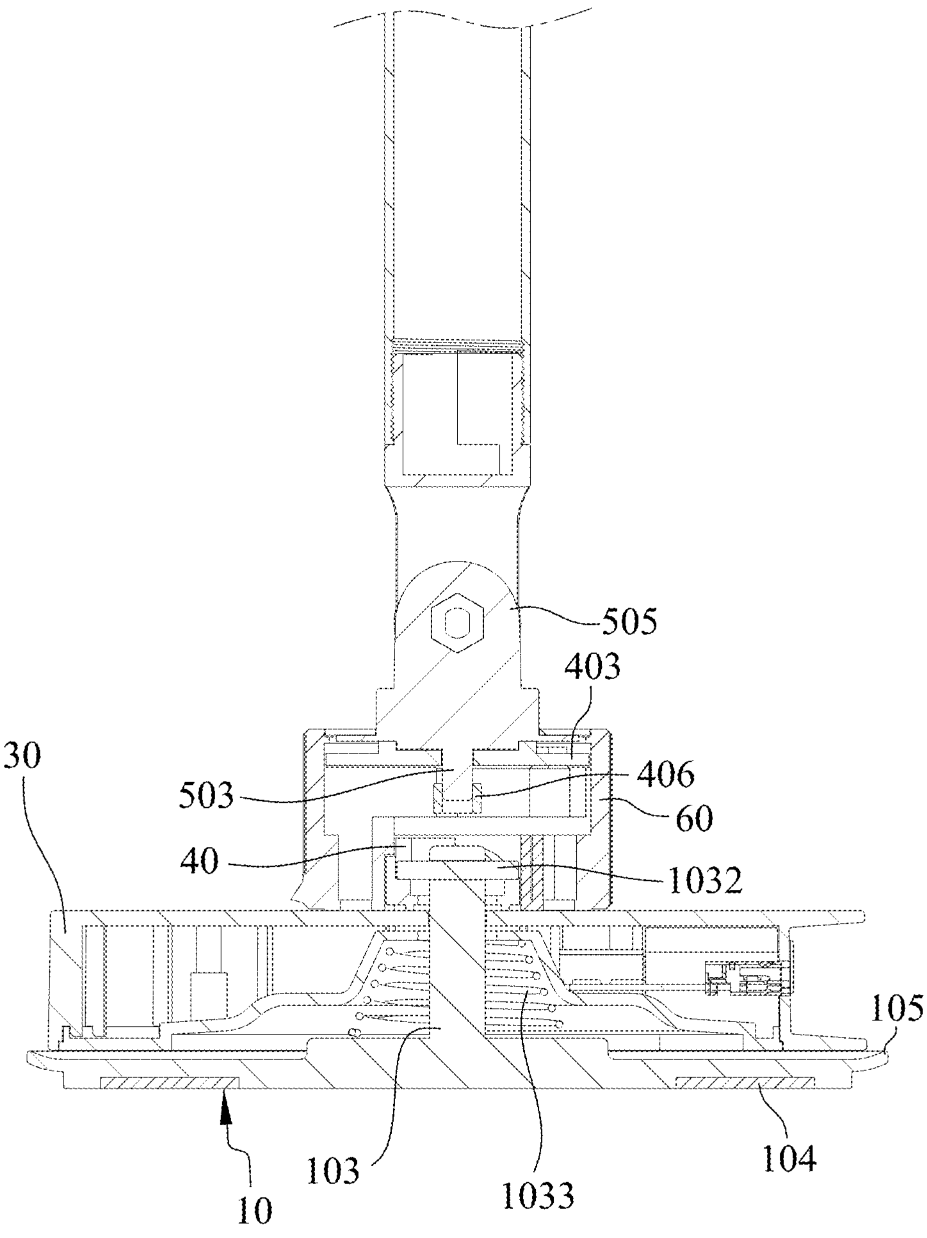
FIG. 9 is a schematic plan cross-sectional view of the fixed bracket structure of the present invention, and showing a state where the suction cup body is not adsorbed.

The structure of the adsorption device formed by combining the suction cup seat 10, the elastic element 1033, the base 20, the housing 30, the cam 40, and the screw cap 60 is shown in FIGS. 8 and 9.

Figure 10:
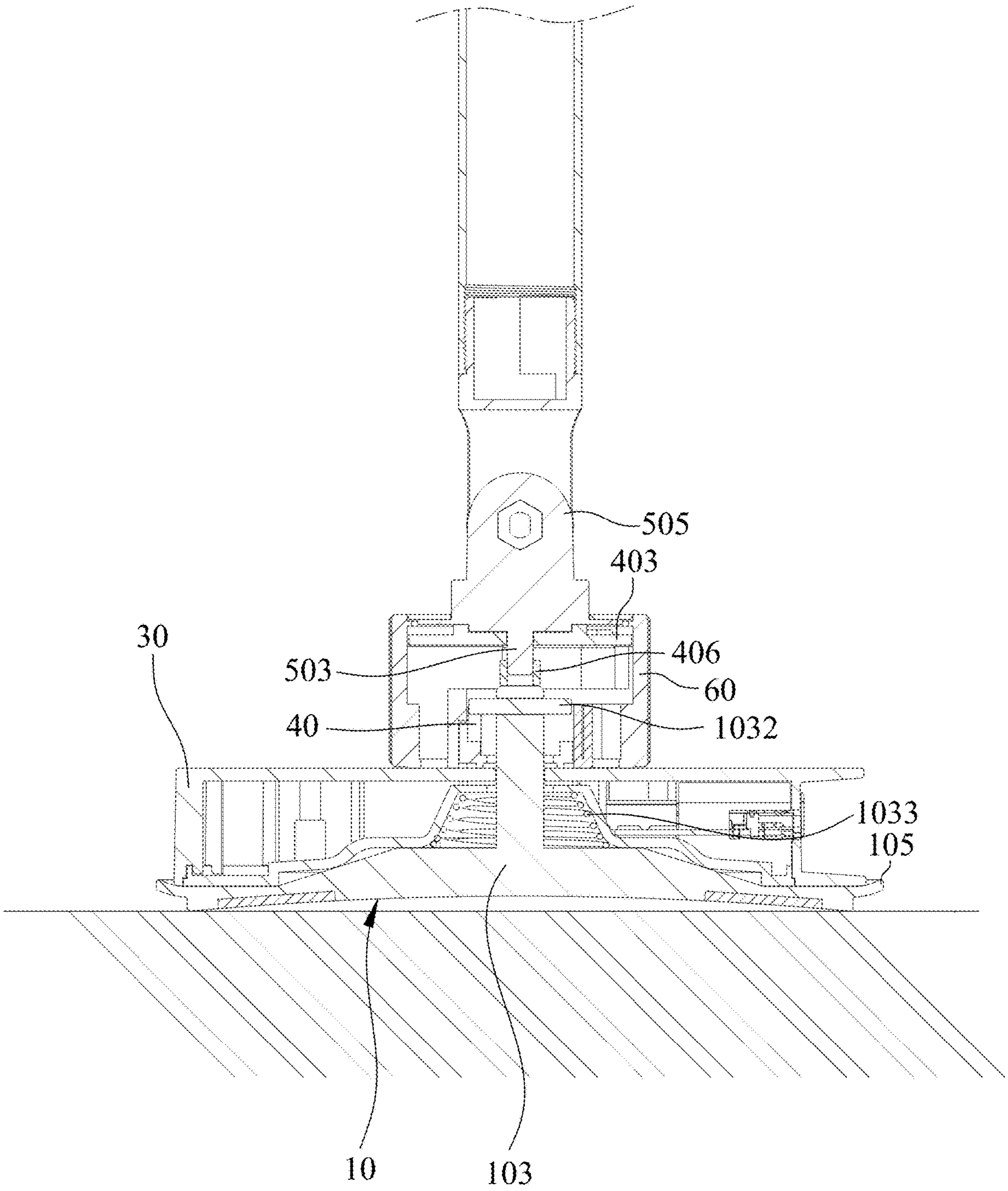
FIG. 10 shows a state where the suction cup body shown in FIG. 9 is pulled up and adsorbed.

By means of the aforementioned adsorption device, when the screw cap 60 is rotated in a first direction (e.g., clockwise), the cam 40 is driven to rotate in the first direction simultaneously, and the cam curve 401 lifts the pin 1032, thereby the shaft 103 is pulled away from the suction cup body 101 (as shown in FIG. 10), so that a vacuum adsorption effect is generated between the suction cup body 101 and the surface of the object to fix together the suction cup body 101 and the ring-shaped adhesive gel sheet 104 formed under the suction cup body 101 to obtain a better fitting effect. On the other hand, when the cam 40 is driven to rotate in a second direction opposite to the first direction (for example, counterclockwise), the elastic force of the elastic element 1033 pushes the suction cup seat 10, and the pin 1032 descends along the cam curve 401, pushing the shaft 103 toward the direction of the suction cup body 101 (as shown in FIG. 9), thereby releasing the vacuum adsorption between the suction cup body 101 and the surface of the object. In addition, in order to know whether the suction cup body 101 is in the adsorption state, the present invention can further form an indicator 604 (such as a protruding arrow, etc.) at an appropriate position on the outer periphery of the screw cap 60 to align with "open" and "closed" position marking portions formed on the surface of the housing 30 (not shown), so that when the screw cap 60 is rotated to the limit position in the first direction so that the suction cup body 101 is in the adsorption fixed state, the indicator 604 just points to the "off" position; when the screw cap 60 is rotated to the limit position in the second direction and the suction cup body 101 is in the released state, the indicator 604 just points to the "open" position. Although not necessary, in order to release the vacuum adsorption of the suction cup body 101 more quickly, the present invention can also form a flange 105 protruding outward on the circumferential outer edge of the suction cup body 101 (as shown in FIGS. 8 to 10). When pulling the protruding flange 105, a gap is formed at the edge of the suction cup body 101, and air may enter the bottom of the suction cup body 101 through the gap to destroy the vacuum state and release the adsorption.

According to the aforementioned adsorption device of the present invention, since the user operates the suction cup body 101 to adsorb or release the surface of the object by rotation at the center of the suction cup seat, the operation is more stable, does not shake, and is more effective. The best suction effect can be obtained and it can be operated with one hand. In addition, there is no need to extend a protrusion on the side of the suction cup body to release the vacuum suction of the suction cup body as in the conventional art, so that the product is more esthetic.

Figure 5:
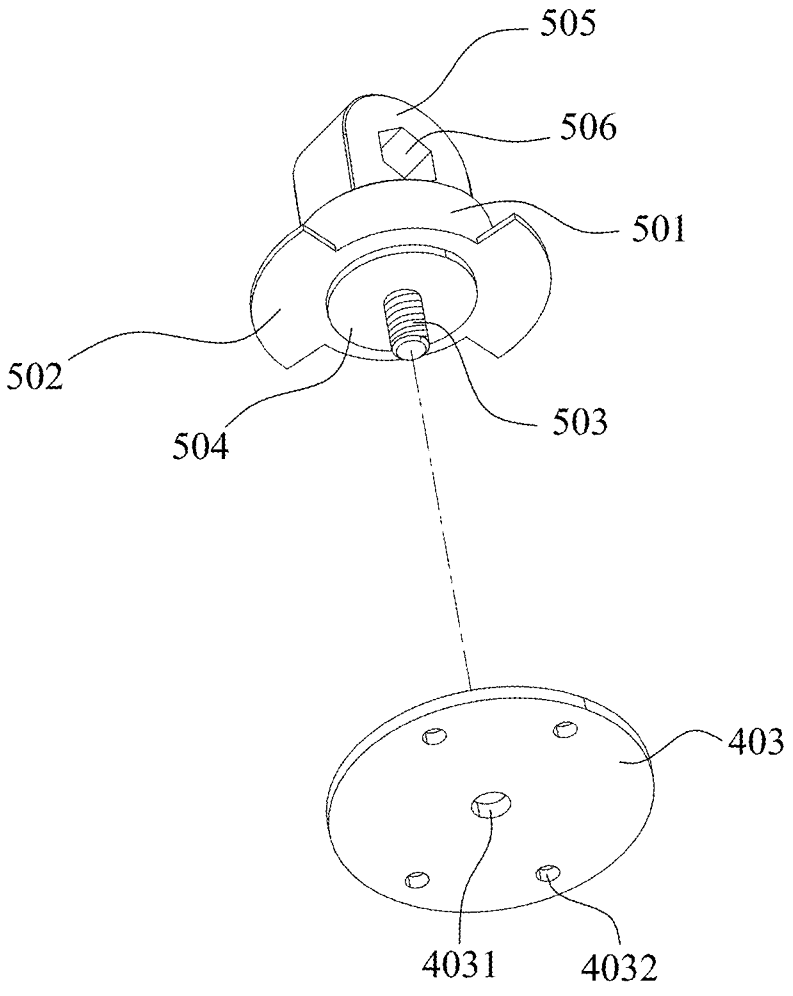
FIG. 5 is a perspective schematic view showing the structure of the first pivot assembly shown in FIG. 2 from another angle.

The adsorption device of the present invention is a device for connecting with the fixed bracket 80. Therefore, the adsorption device is further provided with a first pivot assembly 50, and the fixed bracket 80 is provided with a second pivot assembly 801. The first pivot assembly 50 and the second pivot assembly 801 are rotatably connected to connect the adsorption device and the fixed bracket 80 together. As shown in FIGS. 3 to 5, the first pivot assembly 50 is formed with a base body 501, one end of the base body 501 forms an ear 505, and the other end of the base body 501 forms a screw 503, which passes through the through hole 4031 of the cover plate 403 and then is locked with by a nut 406 to fix the first pivot assembly 50 to the cover plate 403. A polygonal column 507 is inserted into a polygonal hole 506 formed by the ear 505, and the polygonal column 507 is formed with non-circular holes. Preferably, a protruding platform 504 is formed at the other end of the base body 501, and the screw 503 is formed on the protruding platform 504. In addition, a recessed platform 404 for slidingly matching the protruding platform 504 is formed on the cover plate 403. A through hole 4031 is formed at the bottom of the recessed platform 404.

In addition, wings 502 are formed on opposite sides of the base body 501, respectively. Each wing 502 is accommodated in the space between the two sides of the extension walls 301 on the housing 30, so as to avoid the first pivotal assembly 50 to rotate. The cover plate 403 provided with the first pivot assembly 50 is installed at one end of the screw cap 60, and then the screw 405 passes through the hole 4032 provided on the cover plate 403 and locks into the screw hole 3011 of the extension wall 301 to fix the cover plate 403. A decorative piece 603 covers the opening of the screw cap 60 to improve the appearance esthetics.

Figure 6:
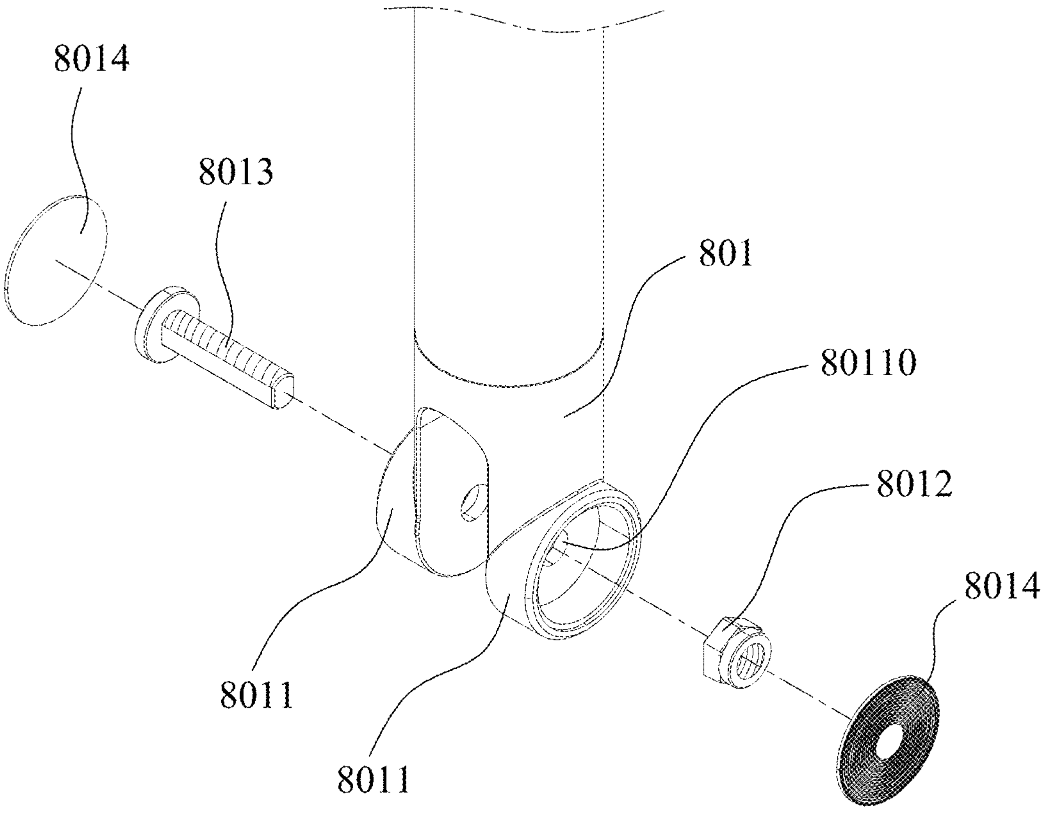
FIG. 6 is an enlarged view of portion B of FIG. 2.

As shown in FIG. 6, the second pivot assembly 801 used to connect with the first pivot assembly 50 is disposed at the lower end of the bracket rod 800 of the fixed bracket 80, wherein the second pivot assembly 801 includes a pair of fixing rings 8011, a fixing nut 8012, a shaft bolt 8013, and a pair of decorative plates 8014; wherein the pair of fixing rings 8011 are formed with through holes 80110; the shaft surface of the shaft bolt 8013 is formed with external threads, and two opposite sides are formed into flat surfaces to form a shape that can match the non-circular hole of the polygonal column 507.

When the first pivot assembly 50 and the second pivot assembly 801 are assembled, the first pivot assembly 50 is placed between the two fixing rings 8011, and then the shaft bolt 8013 passed through the fixing ring 8011 on one side and the polygonal column 507 provided on the first pivot assembly 50, and then passes through the fixing ring 8011 on the other side, then locks the fixing nut 8012 on the shaft bolt 8013, and finally covers the two fixing rings with two decorative plates 8014 respectively to maintain aesthetics, thereby completing the connection between the fixed bracket 80 and the adsorption device (as shown in FIG. 11).

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An adsorption device for fixed bracket, comprising:

a suction cup seat, having a flexible suction cup body and a shaft formed at a center of a back side of the suction cup body;

an elastic element disposed on the suction cup seat;

a base, having a raised portion formed at a central position, and a central hole formed at the raised portion;

a housing, having a shaft hole formed at a central position, and two extension walls formed on the housing and symmetrically arranged with the shaft hole as the center;

a cam, arranged on the housing and passed through by the shaft;

a pin, arranged perpendicularly to the shaft and making the shaft contact a cam curve of the cam; and a screw cap, rotatably arranged on the housing and connected to the cam;

wherein two ends of the elastic element act on the suction cup seat and the base;

wherein when the screw cap is rotated in a first direction to rotate the cam in the first direction, the cam drives the shaft through the pin to move away from the suction cup body, so that a vacuum adsorption effect is generated between the suction cup body and an object; and when the screw cap is rotated in a second direction opposite to the first direction to drive the cam to rotate in the second direction, the cam drives the shaft to move toward the direction close to the suction cup body through the pin, thereby releasing the vacuum adsorption effect between the suction cup body and the object.

2. The adsorption device for fixed bracket according to claim 1, wherein a cylinder is concentrically formed in the screw cap, and a plurality of grooves is formed on an inner surface of the cylinder; and wherein the cam is cylindrical, a plurality of convex strips is formed on an outer surface of the cam, and the convex strips are slidably matched to the grooves so that the cam is connected to the screw cap.

3. The adsorption device for fixed bracket according to claim 2, wherein free ends of the extension walls are respectively provided with a plurality of screw holes, and the cover plate is provided with a plurality of holes corresponding to the screw holes, and a plurality of screws is screwed into the cover plate by passing through the holes to fix the cover plate to the extension walls.

4. The adsorption device for fixed bracket according to claim 1, further comprising:

a cover plate, fixedly disposed on free ends of the extension walls of the housing.

5. The adsorption device for fixed bracket according to claim 4, further comprising:

a first pivot assembly, arranged on the cover plate and exposing the screw cap and used to connect with a second pivot assembly rotatably disposed on a bracket rod of the fixed bracket.

6. The adsorption device for fixed bracket according to claim 5, wherein the first pivot assembly has a base body, one end of the base body forms an ear, and another end of the base body forms a screw, and the screw passes through a through hole of the cover plate to match a nut, so as to dispose the first pivoting assembly on the cover plate.

7. The adsorption device for fixed bracket according to claim 6, wherein the base body forms a protruding platform at the another end of the base body, and the screw is formed on the protruding platform; and wherein the cover plate is formed with a recessed platform, the through hole is located at a bottom of the recessed platform, and the protruding platform matches with the recessed platform.

8. The adsorption device for fixed bracket according to claim 6, wherein the base body is formed with wings on opposite sides of the base body, each wing is accommodated in a space between sides of the two extension walls to prevent the first pivot assembly from rotating.

9. The adsorption device for fixed bracket according to claim 1, wherein the shaft has a non-circular radial cross section, and the shaft hole has a shape corresponding to the radial cross section of the shaft.

10. The adsorption device for fixed bracket according to claim 1, wherein a fixing portion made of material harder than that of the suction cup body is formed at a center of the suction cup seat, and the shaft is formed on the fixing portion.

11. The adsorption device for fixed bracket according to claim 1, wherein a ring-shaped adhesive gel sheet is provided under the suction cup body.

12. The adsorption device for fixed bracket according to claim 11, wherein the adhesive gel sheet is PU glue.

13. The adsorption device for fixed bracket according to claim 1, wherein a flange protruding outward is formed on a circumferential outer edge of the suction cup body.

* * * * *